United States Patent
Kodimer et al.

(10) Patent No.: US 11,876,936 B1
(45) Date of Patent: Jan. 16, 2024

(54) SYSTEM AND METHOD FOR DYNAMIC TABS BASED SELECTION IN A ROLE-BASED SOFTWARE SYSTEM USER INTERFACE

(71) Applicant: Toshiba TEC Kabushiki Kaisha, Shinagawa-ku (JP)

(72) Inventors: Marianne Kodimer, Huntington Beach, CA (US); Matthew Chan, Lake Forest, CA (US)

(73) Assignee: TOSHIBA TEC KABUSHIKI, Tokyo (JP)

(*) Notice: Subject to any disclaimer, the term of this patent is extended or adjusted under 35 U.S.C. 154(b) by 0 days.

(21) Appl. No.: 17/941,710

(22) Filed: Sep. 9, 2022

(51) Int. Cl.
*H04N 1/00* (2006.01)
*H04N 1/44* (2006.01)

(52) U.S. Cl.
CPC ..... *H04N 1/00514* (2013.01); *H04N 1/00432* (2013.01); *H04N 1/00474* (2013.01); *H04N 1/4433* (2013.01); *H04N 2201/0094* (2013.01)

(58) Field of Classification Search
CPC ........... H04N 1/00514; H04N 1/00432; H04N 1/00474; H04N 1/4433; H04N 2201/0094
See application file for complete search history.

(56) References Cited

U.S. PATENT DOCUMENTS

| | | | |
|---|---|---|---|
| 2009/0112791 A1* | 4/2009 | Nakagoshi | H04N 1/4433 |
| 2012/0260350 A1* | 10/2012 | Yamada | H04N 1/00514 |
| | | | 726/28 |
| 2013/0278960 A1* | 10/2013 | Nishiyama | H04N 1/4433 |
| | | | 358/1.14 |
| 2013/0335770 A1* | 12/2013 | Yasukawa | G06F 3/1238 |
| | | | 358/1.14 |
| 2016/0080588 A1* | 3/2016 | Sasaki | H04N 1/4426 |
| | | | 358/1.15 |
| 2022/0141353 A1* | 5/2022 | Kamekawa | H04N 1/00 |
| | | | 358/1.14 |

* cited by examiner

*Primary Examiner* — Juan M Guillermety
(74) *Attorney, Agent, or Firm* — Ulmer & Berne LLP; John X. Garred (57) ABSTRACT

A system and method for dynamic tabs-based selection role-based print management web portal determines a role assigned to a logged in user. A user is provided with selectable tabs based on their determined role. Users with rolls allowing access to customer information can select customers for management of customer information or management of customer devices. Tabs are generated based on selected customer properties. Users with administrative roles are enabled to further configure, adjust and troubleshoot devices. Users with an end user role are limited to device tasks and management of their own information. Super users are unrestricted and have access to all functions of all users. Thus, functionality is added based on a user's role in a non-redundant manner.

18 Claims, 10 Drawing Sheets

SYSTEM AND METHOD FOR DYNAMIC TABS BASED SELECTION IN A ROLE-BASED SOFTWARE SYSTEM USER INTERFACE

TECHNICAL FIELD OF THE INVENTION

This application relates generally to printing and print management. The application relates more particularly to a user interface and workflow for a role-based print management web portal.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are configured, used and managed by users having different roles. Typical role-based software solutions include additive functionality that is redundant and inconsistent when accessed by users.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Role-based software solutions, such eBRIDGE Global Print from ToshibaTEC, may be based on a multirole implementation whereby permissions for each role are presented to users via a user interface. Multirole users may be presented with a user interface wherein features are additive. However, a problem with most role-based software solutions is that an associated user interface presents additive functionality that is redundant and inconsistent. Example embodiments herein provide an improved user experience and workflow for a role-based print management web portal wherein roles are presented in a predictable and intuitive manner without adding unnecessary redundancy. Dynamic tabs are generated on a user interface based on selected customer properties. An extensible user interface accommodates additive functionality in a non-redundant manner. A role-based software system is provided wherein permissions for each role are presented in the user interface based on a list of entities and associated dynamic tabs. The entity list is dynamic wherein the user can create, edit, and delete entities. A super user role is provided access to all permissions of a selected entity and associated tabs are dynamically updated with each entity selection. Color coding is suitably used to visually map selected entity and associated feature tabs that belong to the entity.

Where the default entity for the logged-in user is shown with a unique visual property, such as bold font, and anchored in the first ordinal position regardless of sorting preference making it easily accessible; the default entity is user dependent. Entity tabs may be similar, different, and dynamically changing, depending on the associated entity metadata.

Figure 1:
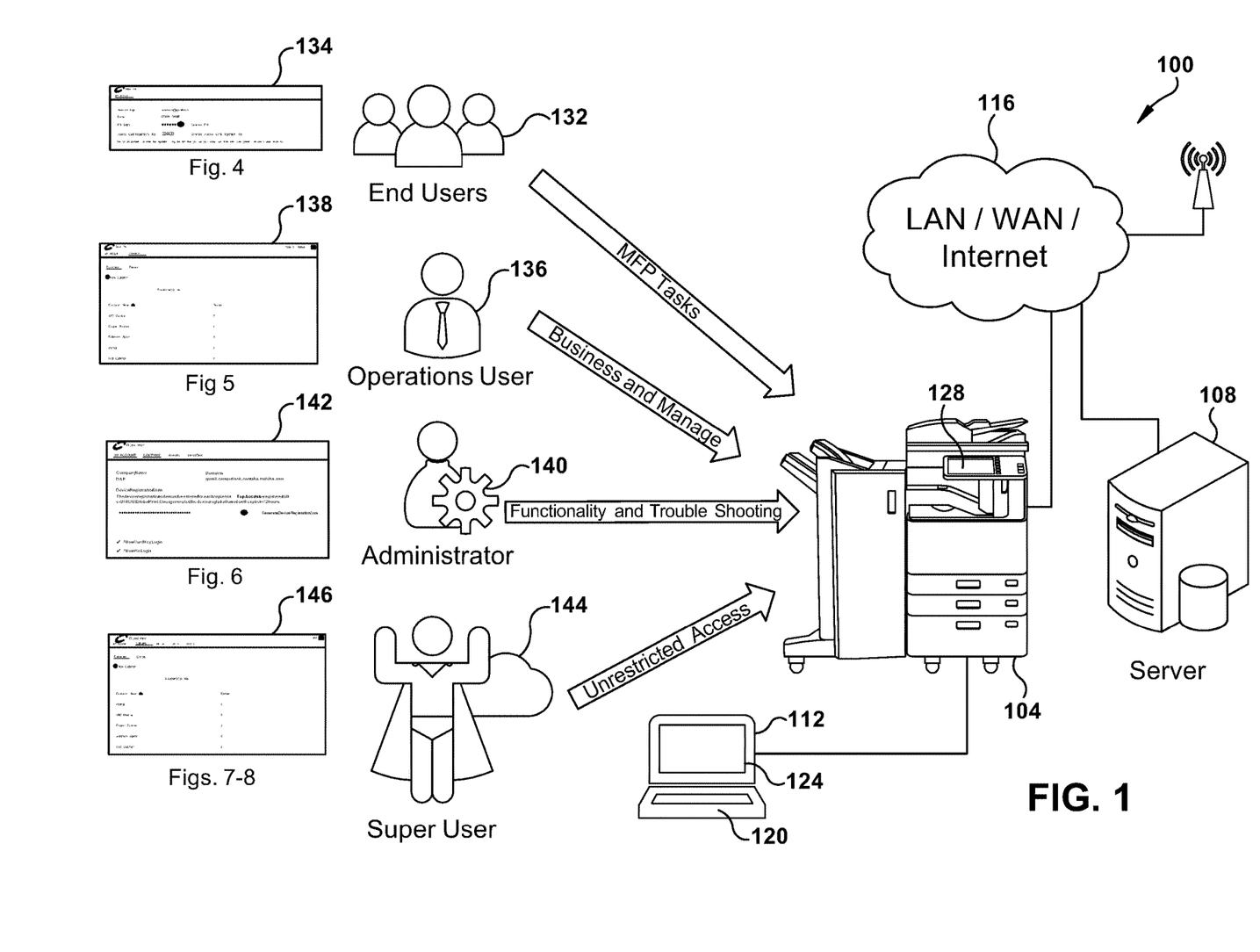
FIG. 1 an example embodiment of a system for dynamic tabs-based selection in a role-based software system.

FIG. 1 illustrates an example embodiment of a system 100 for dynamic tabs-based selection in a role-based software system. One or more MFPs, such as MFP 104, are in data communication with one or more print servers, such as server 108 and one or more user devices, such as computer 112. Data communication is via network cloud 116, suitably comprised of a local area network (LAN), a wide area network (WAN), which may comprise the Internet, or any suitable combination thereof. Network cloud is comprised of any suitable wireless or wired data connection or combination thereof. Computer 112 includes a user interface comprised of a user input, illustrated by keyboard 120 and display 124. It is understood that any suitable user device may be used, such as a smartphone, tablet computer, notebook computer, workstation, or the like. Touchscreen 128 of MFP 104 may also provide a usable user interface.

Users access a print management system via computer 112. In the illustrated example embodiment, four classes of users a represented. End users 132 use the interface to complete MFP tasks, such as printing, scanning, faxing, copying, email, file access and file storage. End users may also have access to their own account information when viewing role-specific displays wherein they can add or edit personal data or personal settings, enter payment information, and the like. An example role-specific display is end user interface 134 as detailed in connection with FIG. 4, below. Operations user 136, in addition to functions used by end users, also undertakes business and management functions, such as customer administration, customer account administration, tracking, and the like. An example role-specific display is operations user interface 138 as detailed in connection with FIG. 5, below. Administrator 140 is a user that can modify MFP functionality, such as device settings, and engages in trouble shooting. The administrator may also be provided with functions available to end users and/or functions available operations users. An example role-specific display is administrator user interface 142 as detailed in connection with FIG. 6, below. Super user 144 has unrestricted access to all device functionality and data, which would include all functions available to end users, operations users and administrators. An example role-specific display is super user interface 146 as detailed in connection with FIGS. 7-8, below. Interfaces are suitably generated by MFP 104, server 108 or computer 112, alone or in combination.

Figure 2:
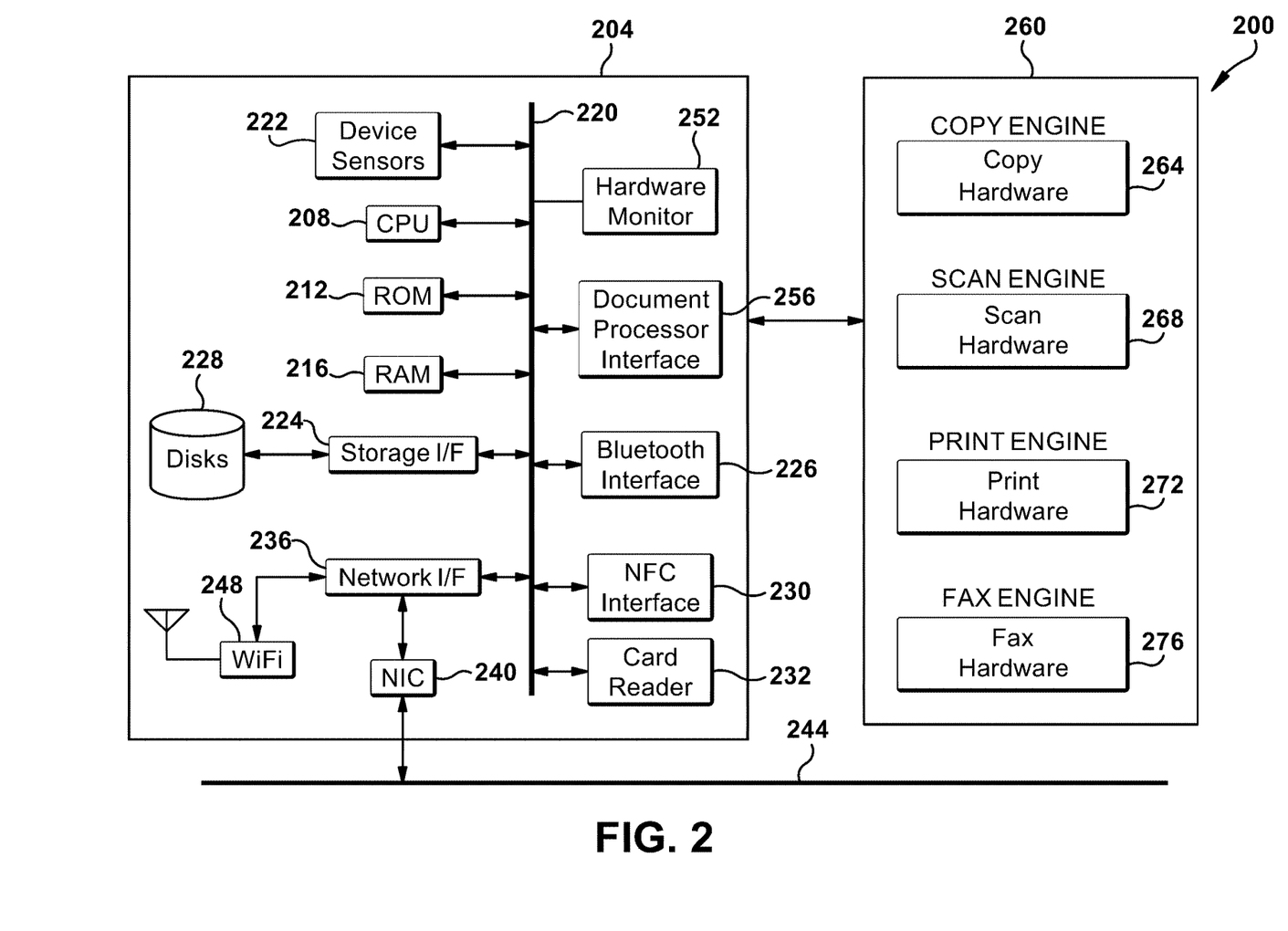
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 222 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise document rendering system 260. It will be understood that functional units are suitably comprised of intelligent units, including any suitable hardware or software platform.

Figure 3:
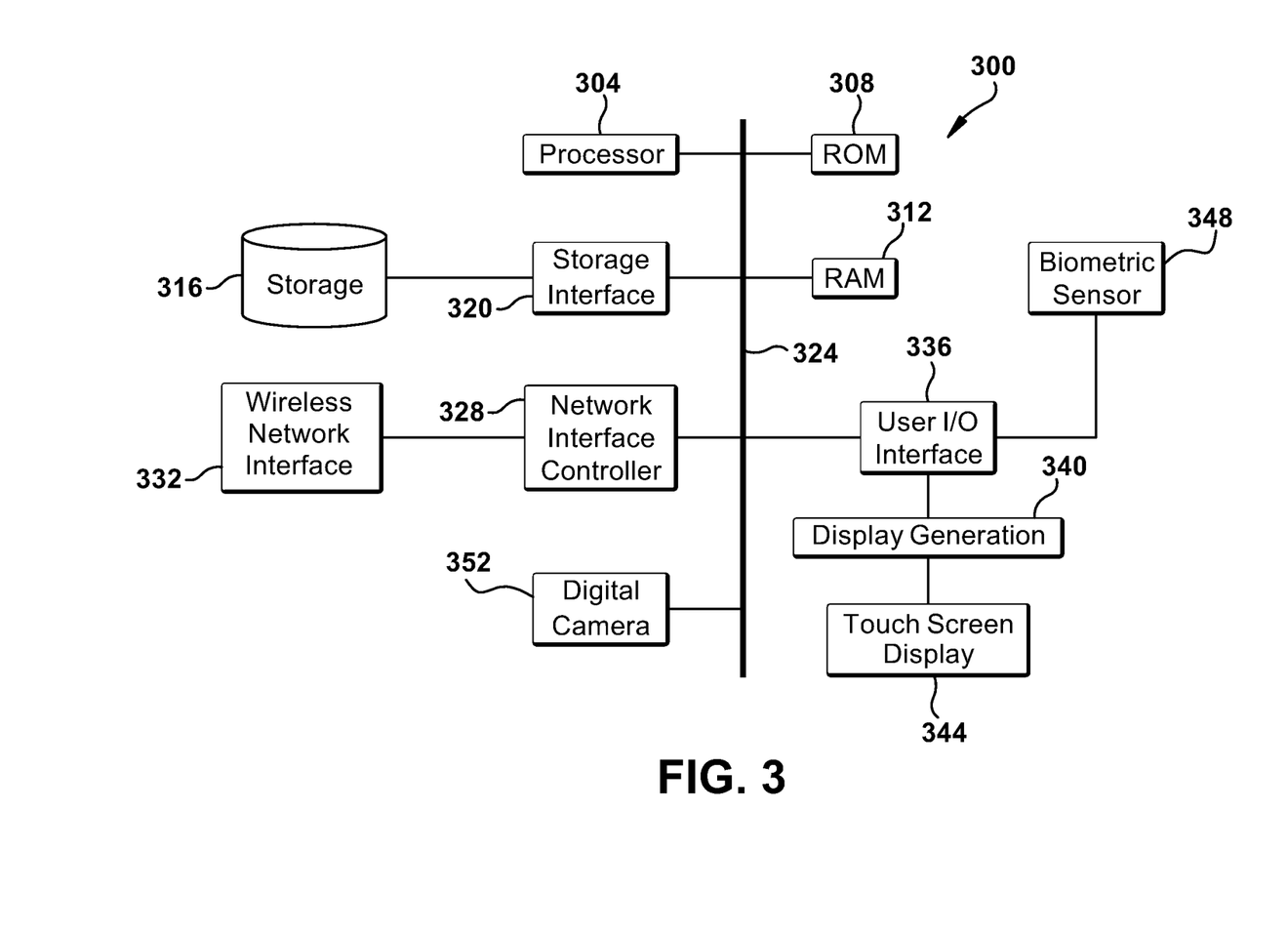
FIG. 3 is an example embodiment of a digital device system.

Turning now to FIG. 3, illustrated is an example embodiment of a digital data processing device 300 such as server 108 and computer 112 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 processor is also in data communication with a digital camera 352, suitably used to capture images which may include encoded images such as barcodes or QR codes. Digital camera 352 is also suitably used for facial recognition, including facial recognition for securing device access.

Figure 4:
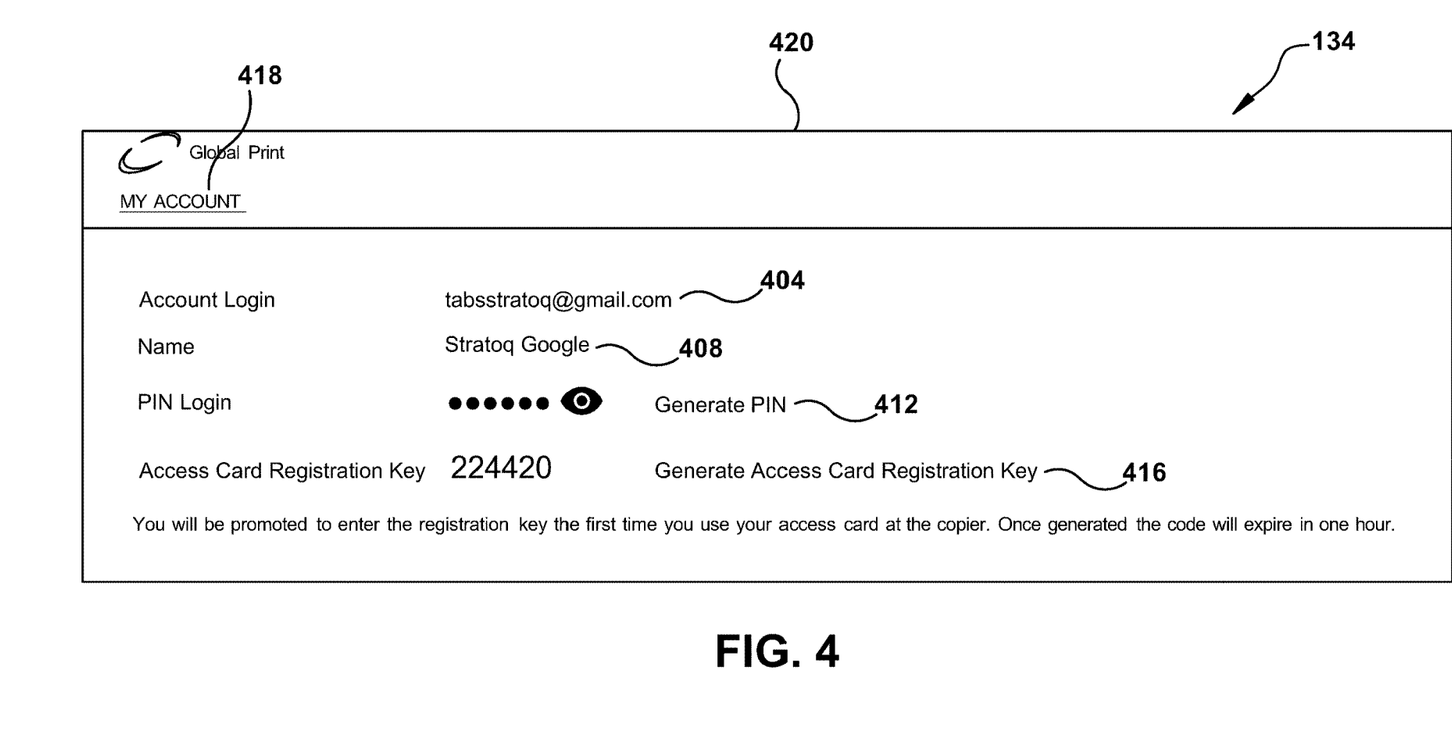
FIG. 4 is an example embodiment of a of end user interface 134 of FIG. 1.

FIG. 4 illustrates an example embodiment of end user interface 134 of FIG. 1. In the illustration, an end user provides their login credentials, including username 404 and system name 408. A registered user may generate a pin by selecting generate PIN button or by generating an access card registration key by selecting button 416. It is to be noted that the user is given access to a single MY ACCOUNT tab 418 in tab bar 420. A logged in user then has access to basic MFP device functions.

Figure 5:
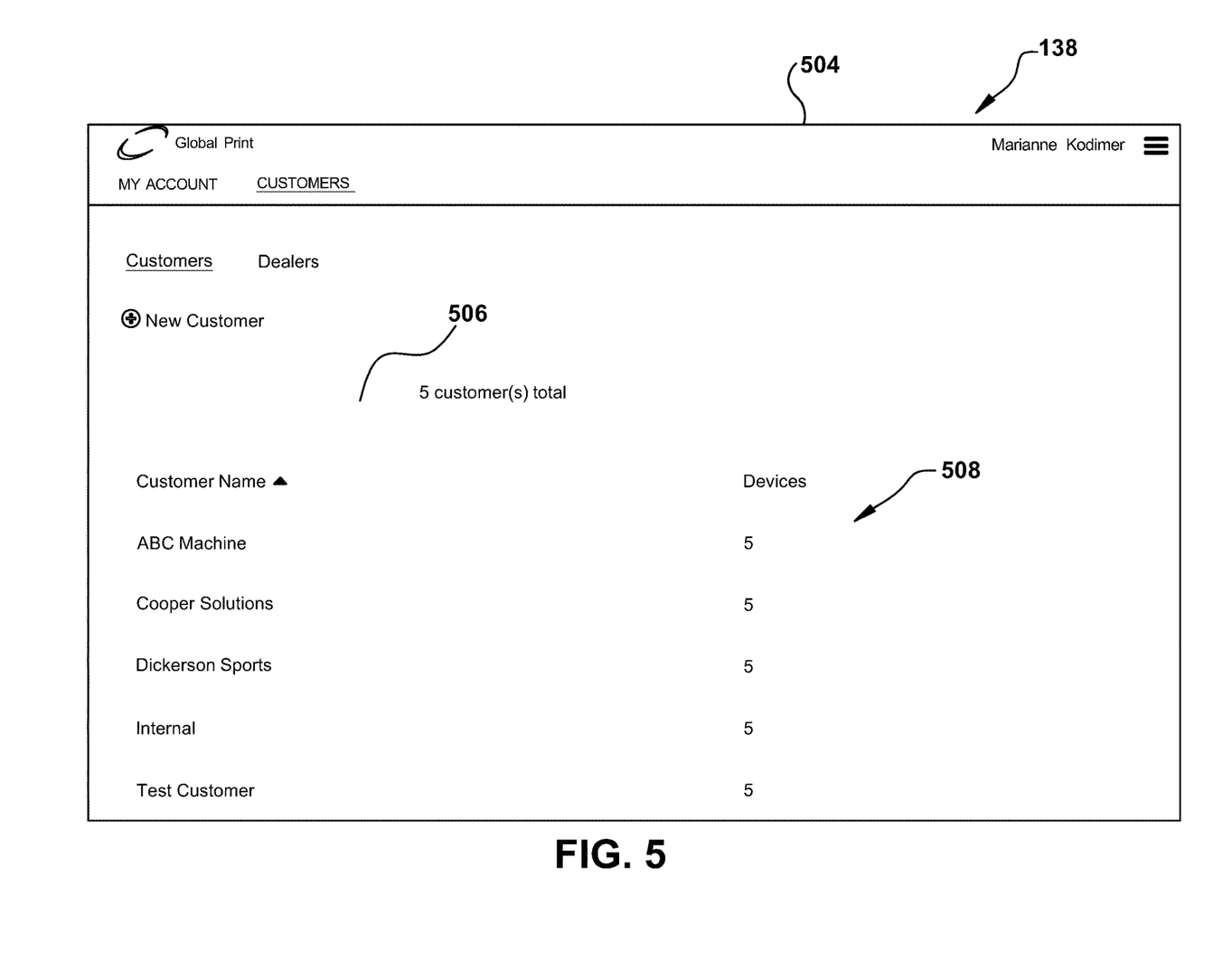
FIG. 5 is an example embodiment of operations user interface 138 of FIG. 1.

FIG. 5 illustrates an example embodiment of operations user interface 138 of FIG. 1. Operations users may be device dealers tasked with creating and maintaining customer information. When logged in as an operations user, tab bar 504 has, in addition to a MY ACCOUNT tab as is available to end users, a CUSTOMERS tab, indicated as the active tab by underlining. A new customer may be added via text entry block 506. List 508 shows existing customers, along with a number of associated devices.

Figure 6:
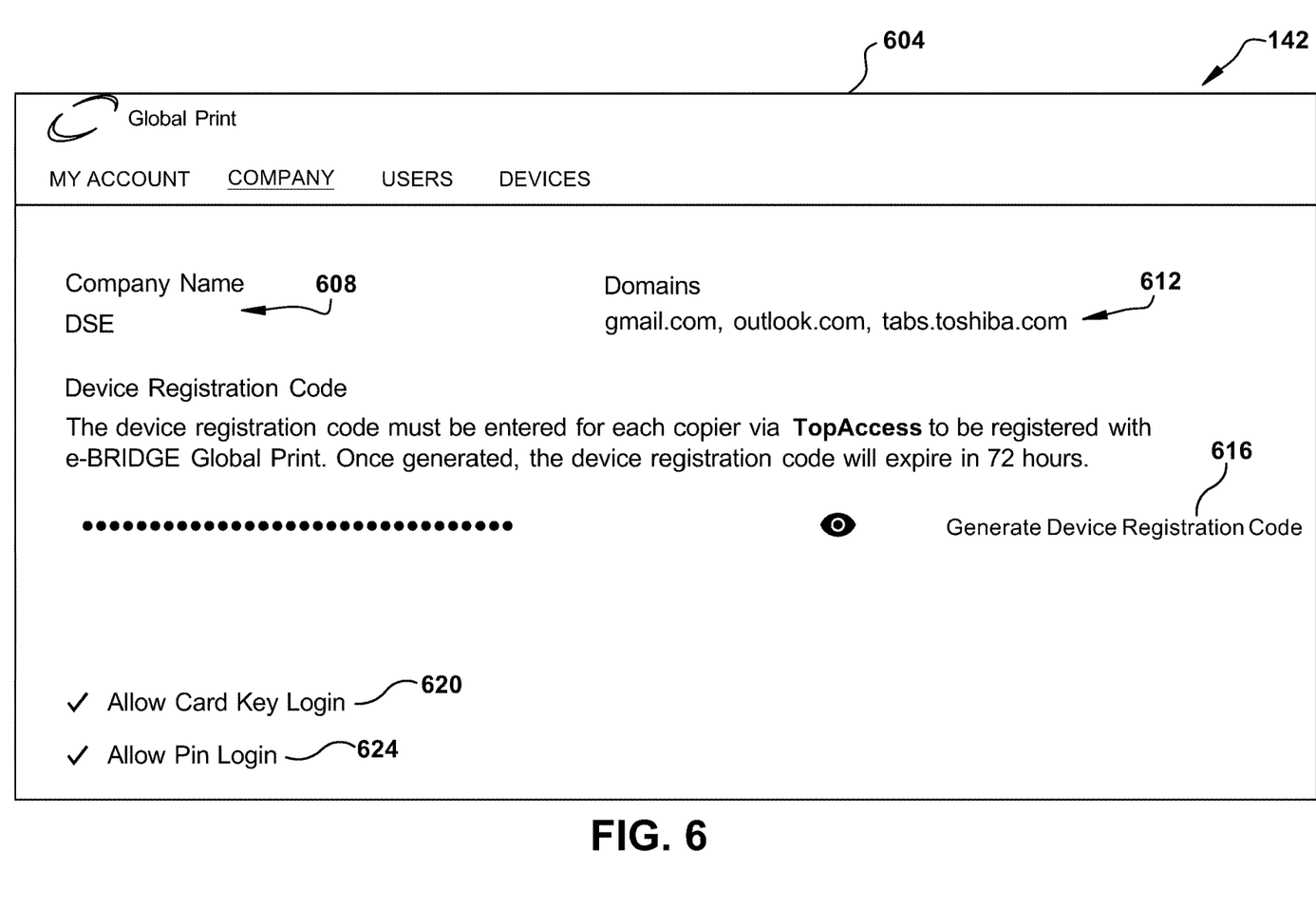
FIG. 6 is an example embodiment of administrator interface 142 of FIG. 1.

FIG. 6 illustrates an example embodiment of administrator user interface 142 of FIG. 1. Administrators are typically on-premises administrators of a business and manage functions related to the company, end users and devices. Administrator user interface 142 includes tab bar 604 which this time includes selectable tabs for MY ACCOUNT, COMPANY, USERS and DEVICES. In the example, the COMPANY tab has been selected, indicated by underlining of COMPANY to differentiate the active tab from the inactive tabs. When the COMPANY tab is active, the administrator is provided with company related functions, such as setting company name 608 and domain names 612. The administrator may register devices by selecting generate device registration code button 616. The administrator may also set parameters, such as whether users can use key card logins 620 or pin login 624. The administrator is not given access to a CUSTOMER tab as is an operations user.

Figure 7:
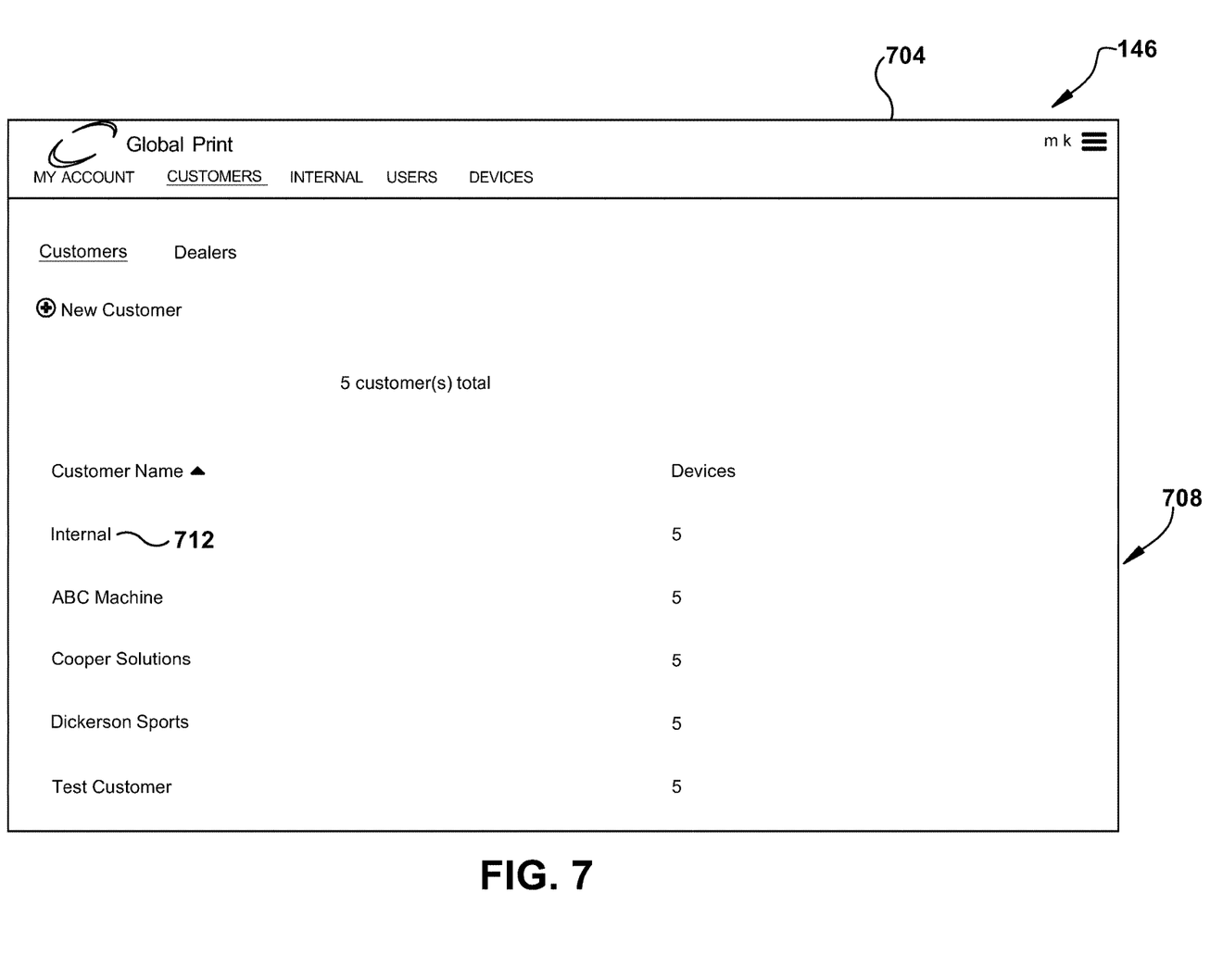
FIG. 7 is an example embodiment of super user interface 146 of FIG. 1.
Figure 8:
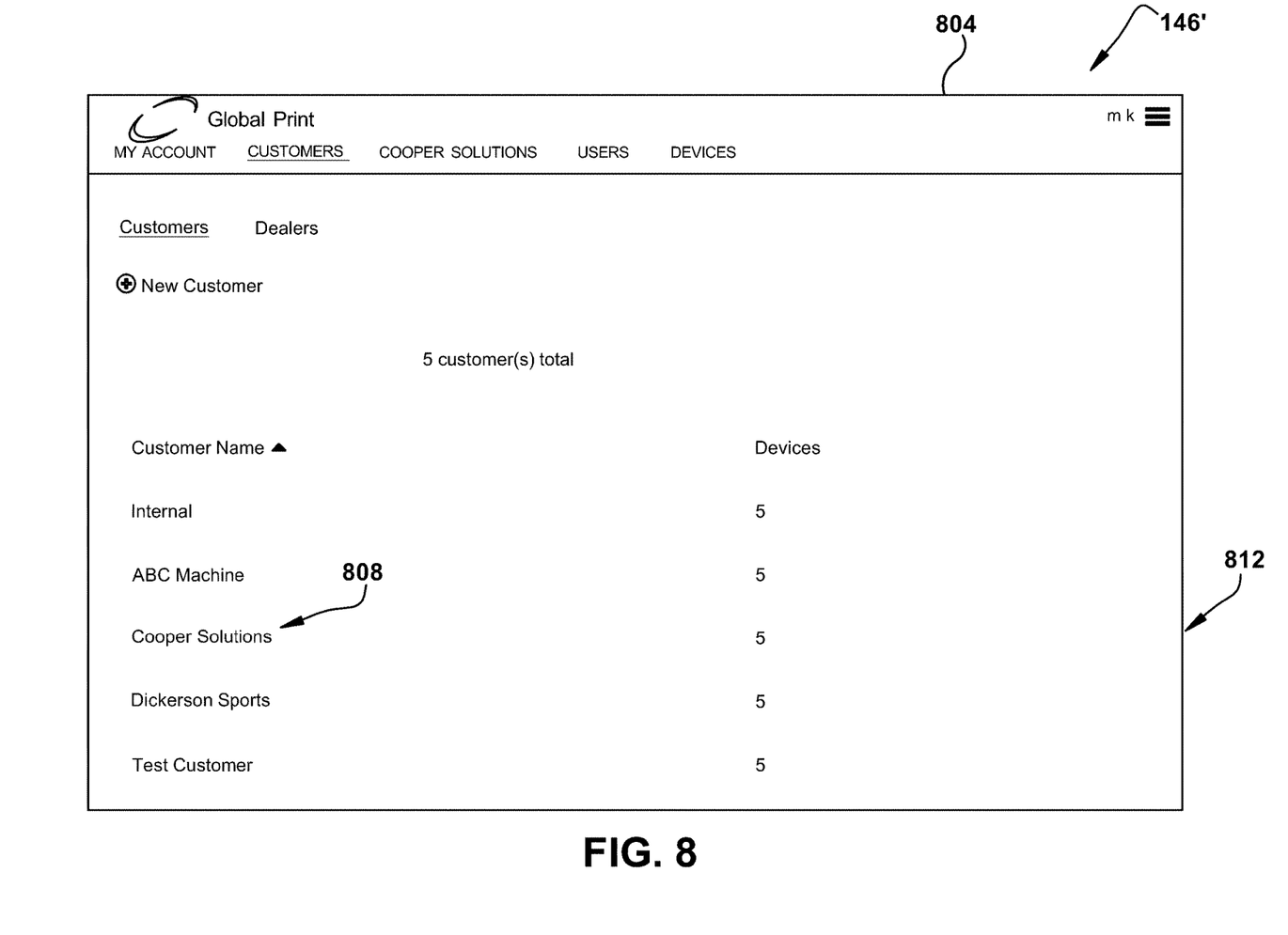
FIG. 8 is another example embodiment of super user interface 146 of FIG. 1.

FIGS. 7 and 8 illustrate an example embodiment of super user interface 146 of FIG. 1. Super users have full, unrestricted functionality and troubleshooting capability. When logged in as a super user, tab bar 704 includes the MY ACCOUNT tab available to end users, operations users and administrators. Also included is a CUSTOMERS tab as is available to operations users. Also included are tabs for COMPANY, USERS and DEVICES available to administrators. List 708 shows existing customers, along with a number of associated devices. A dealer may list itself, along with its devices, as a customer to track its own needs. In the example, company 712 is such a listing and appears as "Internal," which has been selected, becoming highlighted and displacing the listing for "COMPANY" with a highlighted entry for "INTERNAL." This may suitably be a default super user view.

FIG. 8 illustrates an example embodiment of a super user interface 146' wherein tab bar 804 shows a highlighted, selected company entry for COOPER SOLUTIONS, which has been selected from and highlighted in company list 812.

The example super user interfaces of FIGS. 7 and 8 enable a super user to access all functionality in a usable way that is consistent and efficient. The super user is provided a user interface which, is like that of the operations user, contains a CUSTOMERS tab with functionality to create, edit, and delete customers. The super user has added functionality applied to the customers tab enabling a selection of customers in the customer list. Once selected, that customer's administration tabs are shown in the tab bar allowing the super user to access the administration tabs, and associated functionality, for any customer in a customer database. As noted above, this may be done for one's own company. These dynamic tabs are suitably highlighted, underlined or colored differently to communicate to the user that they are dynamic and based on customer selection.

Figure 9:
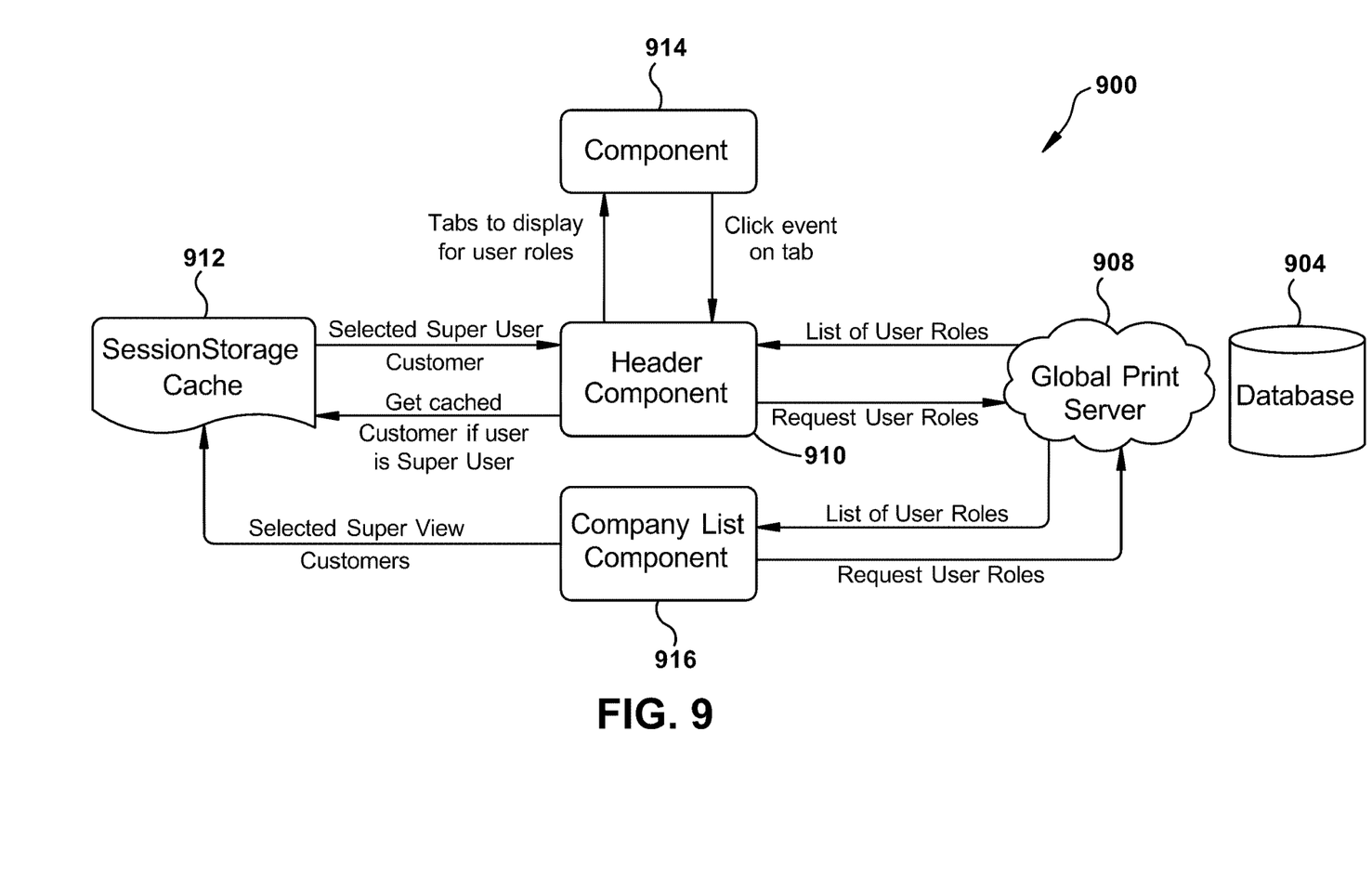
FIG. 9 is an example embodiment of a system overview for a system for dynamic tabs-based selection in a role-based software system.

FIG. 9 illustrates an example embodiment of a system overview 900 for a system for dynamic tabs-based selection in a role-based software system. Customer information is stored in database 904 accessible to a cloud based global print server 908. Global print server 908 receives user role requests from header component 910 and returns a list of user roles. Tabs for user roles are displayed by tabs component 914, and selection of an event tab is provided back to header component 910. Sessions storage cache 912 receives cached customer information from header component 910 if a role of super user is present. Selected super user customer information is then returned to header component 910. Company list component 916 requests user role information from global print server 908 and receives such information from the global print server 908. Company list component 916 provides selected super user customer information to sessions storage cache 912.

Figure 10:
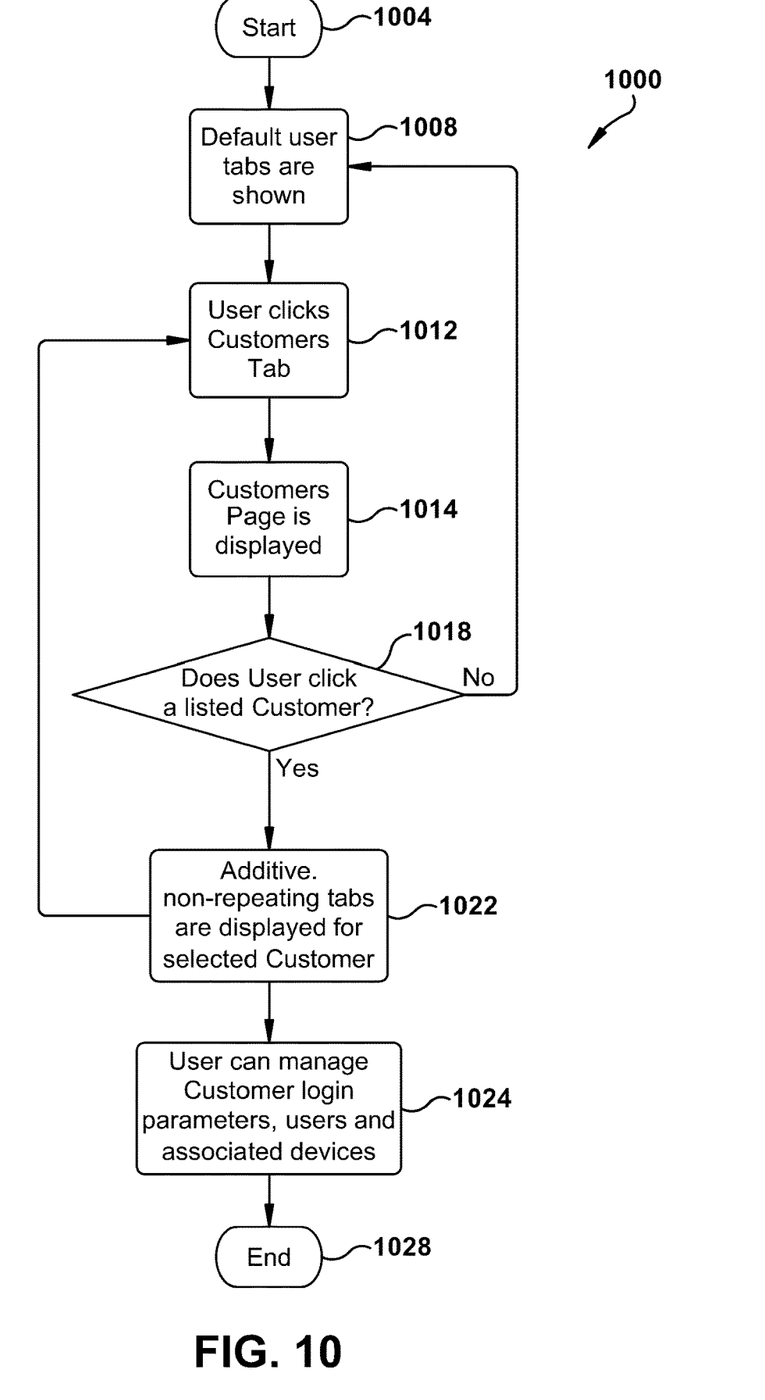
FIG. 10 illustrates a flowchart of an example operation for generation of a dynamic for dynamic tabs-based selection in a role-based software system.

FIG. 10 illustrates a flowchart 1000 of an example operation for generation of a dynamic for dynamic tabs-based selection in a role-based software system. The process commences at block 1004 and proceeds to block 1008 where default user tabs are displayed. A user clicks a Customers tab at block 1012 and an associated page for the selected customer is displayed at 1014. A test is made at block 1018 as to whether a particular customer has been selected. If not, the process returns to block 1008. If so, additive, non-repeating tabs are displayed for the selected customer at block 1022, allowing the user to manage customer login parameters, user and associated devices at block 1024. The process then ends at block 1028.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the spirit and scope of the invention.

What is claimed is:

1. A system comprising:
a processor;
a plurality of multifunction peripheral, each multifunctional peripheral comprising a document processing engine including one or more of a copy engine, a scan engine, a print engine and a fax engine;
a memory storing role data corresponding to each of a plurality of identified users associatively with one of a plurality of roles assigned to each user applicable to each of the plurality of multifunctional peripherals, the plurality of roles including a device user role, a device administrator role, an operations role and a super user role;
the memory further storing permission data corresponding to device permissions associated with each of the plurality of roles;
the memory further storing a unique set of permission groups, each permission group having 1 or more selectable entries, for each of the plurality of roles;
a user interface including a user input and a display;
a data interface;
the processor configured to show a login prompt on the display;
the processor further configured to receive login information responsive to the login prompt from an associated user via the user interface;
the processor further configured to determine a determined role of the user in accordance with received login information;
the processor further configured to further determine the determined role of the user in accordance with one of the plurality of roles;
the processor further configured to generate a role-specific display showings selectable indica that, once selected shows displayed device controls associated with the device permissions associated with the determined role, wherein
a selectable device user indicia that, when selected, enables user account management and associated multifunction peripheral operations,
a selectable adminstrator indicia including the device user indicia and a device management indicia which, when selected, enables device management for the plurality of multifunction peripherals,
a selectable operations indica including the device user indicia and customer management indicia which, when selected, enables management of customers associated with the plurality of multifunctional peripherals, and
a selectable super user indicia including the device user indicia, the device management indicia and the operations indicia;
the processor further configured to receive a selection of one or more of the displayed device controls from the user via the user interface; and
the processor further configured to configure or operate one or more document processing engine in accordance with the selected device controls.

2. The system of claim 1 wherein the displayed device controls include one or more controls for completing tasks via the document processing engine, controls for account management and controls for device configuration.

3. The system of claim 2 wherein
when the determined role is that of an end user role, end user permissions are limited to multifunction peripheral tasks or personal account administration, when the determined role is that of the operations user, wherein the operations user permissions include business and management tasks associated with the multifunction peripheral, when the determined role is that of the administrator, wherein administrator permissions include tasks associated with multifunction peripheral configuration, functionality or troubleshooting functions, and when the determined role is that of the super user, wherein the super user permissions are unrestricted.

4. The system of claim 2 wherein the display showing device controls includes showing each device control with an associated, user-selectable tab.

5. The system of claim 2 wherein business and management tasks include adding, deleting or editing customer information.

6. The system of claim 2 wherein administrator permissions include device registration, device login options, or device network configuration.

7. The system of claim 2 wherein the super user permissions include adding, deleting or editing customer information, device registration, device login options and device network configuration.

8. A method comprising:
storing, in a memory, role data corresponding to each of a plurality of identified users associatively with one of a plurality of roles assigned to each user;
storing, in the memory, permission data corresponding to device permissions associated with each of the plurality of roles;
storing, in the memory, a unique set of permissions for each of the plurality of roles;
showing a login prompt on a user interface display;
receiving login information responsive to the login prompt from an associated user via the user interface;
determining a determined role of the user in accordance with received login information and the roll data as a device user, an administrator, an operations user or a super user;
showing selectable indicia corresponding to device controls associated with permissions associated with the determined role in the display, wherein the selectable indicia include
a selectable device user indicia that, when selected, enables user account management and associated multifunction peripheral operations,
selectable administrator indicia including the device user indicia and a device management indicia which, when selected, enables device management for the plurality of multifunction peripherals,
selectable operations indica including the device user indicia and customer management indicia which, when selected, enables management of customers associated with the plurality of multifunction peripherals, and
selectable super user indicia including the device user indicia, the device management indicia and the operations indicia;
receiving a selection of one or more of the displayed device controls from the user via the user interface; and
configuring or operating a multifunction peripheral in accordance with the selected device controls.

9. The method of claim 8 wherein device controls include controls for completing tasks via a document processing engine, controls for account management and controls for device configuration.

10. The method of claim 9 wherein
when the determined role is that of an end user role, end user permissions are limited to multifunction peripheral tasks or personal account administration,
when the determined role is that of the operations user, operations user permissions include business and management tasks associated with the multifunction peripheral,
when the determined role is that of the administrator, administrator permissions include tasks associated with multifunction peripheral configuration, functionality or troubleshooting functions, and
when the determined role is that of the super user, super user permissions are unrestricted.

11. The method of claim 9 further comprising showing each device control with an associated, user-selectable tab.

12. The method of claim 9 wherein business and management tasks include adding, deleting or editing customer information.

13. The method of claim 9 wherein administrator permissions include device registration, device login options, or device network configuration.

14. The method of claim 9 wherein the super user permissions include adding, deleting or editing customer information, device registration, device login options and device network configuration.

15. A method comprising:
storing, in a memory, an entity list, each entity of the entity list including an associated set of permissions wherein each permission is associated with one or more user roles;
receiving login information from a user;
generating a display including a default entity associated with the user;
receiving, from the user, one or more user instructions for creating, editing or deleting an entity, in the entity list;
receiving, via the user interface, an a selection of an identified entity from the entity list;
determining, via a processor, a role associated with the user;
determining, via the processor, a subset of permissions associated with the identified entity in accordance with a determined role of the user;
displaying selectable indicia associated with each permission of the subset of permissions on the user interface, wherein the selectable indicia include
a selectable device user indicia that, when selected, enables user account management and associated multifunction peripheral operations,
selectable administrator indicia including the device user indicia and a device management indicia which, when selected, enables device management for the plurality of multifunction peripherals,
selectable operations indicia including the device user indicia and customer management indicia which, when selected, enables management of customers associated with the plurality of multifunction peripherals, and
selectable super user indicia including the device user indicia, the device management indicia and the operations indicia;
receiving a user selection of a displayed indicia; and
configuring or operating one or more multifunction peripherals in accordance with a selected indicia.

16. The method of claim 15 further comprising altering an appearance of the selected indicia.

17. The method of claim 16 further comprising displaying one or more feature tabs associated with the selected indicia.

18. The method of claim 17 further comprising altering the appearance of the selected indicia in accordance with metadata associated with the selected indicia.

\* \* \* \* \*